US012465649B2

(12) United States Patent
Mosconi et al.

(10) Patent No.: US 12,465,649 B2
(45) Date of Patent: *Nov. 11, 2025

(54) PACLITAXEL-HYALURONIC ACID CONJUGATE IN THE TREATMENT OF NON-MUSCLE INVASIVE BLADDER CANCER

(71) Applicant: FIDIA FARMACEUTICI S.P.A., Abano Terme (IT)

(72) Inventors: Giorgio Mosconi, Abano Terme (IT); Daniela Jabes, Abano Terme (IT); Carlo Pizzocaro, Abano Terme (IT)

(73) Assignee: FIDIA FARMACEUTICI S.p.A., Abano Terme (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,962

(22) Filed: May 10, 2021

(65) Prior Publication Data

US 2021/0268119 A1    Sep. 2, 2021

Related U.S. Application Data

(63) Continuation of application No. 17/204,183, filed on Mar. 17, 2021, now abandoned, which is a continuation of application No. 16/959,979, filed as application No. PCT/IB2019/059073 on Oct. 23, 2019, now abandoned.

(30) Foreign Application Priority Data

Oct. 25, 2018   (IT) ................. 102018000009731

(51) Int. Cl.
A61K 47/61    (2017.01)
A61K 31/337   (2006.01)

(52) U.S. Cl.
CPC ............ *A61K 47/61* (2017.08); *A61K 31/337* (2013.01)

(58) Field of Classification Search
None
See application file for complete search history.

(56) References Cited

U.S. PATENT DOCUMENTS

| 7,897,584 B2 | 3/2011 | De Luca et al. |
| 9,283,284 B2 | 3/2016 | Renier et al. |
| 2002/0169176 A1 | 11/2002 | Elder et al. |
| 2005/0080075 A1* | 4/2005 | Nichols .............. A61K 47/61 |
| | | 514/225.5 |
| 2014/0314726 A1 | 10/2014 | O'Heeron et al. |

FOREIGN PATENT DOCUMENTS

| CN | 110859962 A | 3/2020 |
| WO | WO 2004/035629 A2 | 4/2004 |

OTHER PUBLICATIONS

What are the Phases of Clinical Trials? [online]. American Cancer Society, available online from Feb. 24, 2017 [retrieved on Dec. 20, 2021]. Retrieved from the internet: <https://www.cancer.org/treatment/treatments-and-side-effects/clinical-trials/what-you-need-to-know/phases-of-clinical-trials.html>. (Year: 2017).*
Bassi et al. Eur Urol Suppl 2018; 17(2); e1056. (Year: 2018).*
Bassi et al., "Paclitaxel-Hyaluronic Acid for Intravesical Therapy of Bacillus Calmette-Guerin Refractory Carcinoma In Situ of the Bladder: Results of a Phase I Study", The Journal of Urology, vol. 185, No. 2, Feb. 1, 2011, pp. 445-449.
Campisi et al., "ONCOFID™-P a Hyaluronic Acid Paclitaxel Conjugate for the Treatment of Refractory Bladder Cancer and Peritoneal Carcinosis", Current Bioactive Compounds, vol. 7, No. 1, Mar. 1, 2011, pp. 27-32.
International Search Report for PCT/IB2019/059073 (PCT/ISA/210) mailed on Jan. 30, 2020.
Montagner et al., "Paclitaxel-hyaluronan hydrosoluble bioconjugate: Mechanism of action in human bladder cancer cell lines", Urologic Oncology Seminars and Original Investigations, vol. 31, No. 7, Oct. 1, 2013, pp. 1261-1269.
Rosato et al., "HYTAD1-p20: A new paclitaxel-hyaluronic acid hydrosoluble bioconjugate for treatment of superficial bladder cancer", Urologic Oncology Seminars and Original Investigations, vol. 24, No. 3, May 1, 2006, pp. 207-215.
Written Opinion of the International Searching Authority for PCT/IB2019/059073 (PCT/ISA/237) mailed on Jan. 30, 2020.
"EudraLex—The Rules Governing Medicinal Products in the European Union," European Commission—Enterprise and Industry Directorate-General, vol. 4, Brussels, Feb. 3, 2010, 19 pages total.
"Physicians' Desk Reference," Wikipedia, May 31, 2022, URL: <https://en.wikipedia.org/wiki/Physicians%27_Desk_Reference>.
"Product Information—ABRAXANE (nanoparticle albumin-bound paclitaxel)," 2020, 3 pages total.
"Step 3: Clinical Research," FDA, 2021, URL: <https://www.fda.gov/patients/drug-development-process/step-3-clinical-research>.
"The Journal of Urology," Wikipedia, accessed on Jan. 21, 2025, 2 pages total, URL: <https://en.wikipedia.org/w/index.php?title=The_Journal_of_Urology&oldid=1167464428>.
Balas et al., "Synthesis, structural characterization and biological studies of the triphenyltin(IV) complex with 2-thiobarbituric acid," European Journal of Medicinal Chemistry, vol. 46, No. 7, 2011, pp. 2835-2844, 1 page total.

(Continued)

*Primary Examiner* — Katherine Peebles
(74) *Attorney, Agent, or Firm* — Birch, Stewart, Kolasch & Birch, LLP

(57) ABSTRACT

A pharmaceutical composition is described, essentially consisting of the paclitaxel prodrug associated with pharmacologically acceptable diluents/excipients, for use in the treatment of non-muscle invasive bladder cancer (NMIBC) by means of intravesical instillations according to a single weekly dose of 600 mg of said prodrug, or two weekly doses equal to a total of 1,200 mg, for 12 or 6 consecutive weeks of treatment. The paclitaxel prodrug used was prepared according to an indirect synthesis process between molecules of hyaluronic acid (HA) and paclitaxel by introducing a spacer (4-bromobutyric acid) between the hyaluronic acid and chemotherapeutic agent.

4 Claims, No Drawings

(56) References Cited

OTHER PUBLICATIONS

Barlow et al., "A single-institution experience with induction and maintenance intravesical docetaxel in the management of non-muscle-invasive bladder cancer refractory to bacille Calmette-Guérin therapy," BJU International, vol. 104, No. 8, 2009, pp. 1098-1102, 1 page total.
Barlow et al., "Long-term survival outcomes with intravesical docetaxel for recurrent nonmuscle invasive bladder cancer after previous bacillus Calmette-Guérin therapy," Journal of Urology, vol. 189, No. 3, 2013, pp. 834-839, 1 page total.
Bassi et al., "732-Oncofid-P-B (paclitaxel-hyaluronic acid) in the intravesical therapy of patients affected by primary or recurrent Ta G1-G2 papillary cancer of the bladder. A phase II marker lesion study," European Urology Supplements, vol. 17, No. 2, 2018, pp. e1056-e1057, 4 pages total.
Bioptic—definition of bioptic by Medical dictionary, Grammarly, Nov. 29, 2023, 2 pages total.
Brooks et al., "Treatment options in non-muscle-invasive bladder cancer after BCG failure," Indian Journal of Urology, vol. 31, No. 4, 2015, pp. 312-319.
Chang et al., "Phase II study of taxol, merbarone, and piroxantrone in stage IV non-small-cell lung cancer: The Eastern Cooperative Oncology Group Results," Journal of the National Cancer Institute, vol. 85, No. 5, 1993, pp. 388-394, 1 page total.
Dalbagni et al., "Phase II trial of intravesical gemcitabine in bacille Calmette-Guérin-refractory transitional cell carcinoma of the bladder," Journal of Clinical Oncology, vol. 24, No. 18, 2006, pp. 2729-2734, 1 page total.
Dent et al., "Phase I trial design: Are new methodologies being put into practice?," Annals of Oncology, vol. 7, 1996, pp. 561-566.
Dimaggio et al., "Phase I Clinical and Pharmacological Study of Merbarone," Cancer Research, vol. 50, 1990, pp. 1151-1155.
Jain et al., "Phase I Oncology Studies: Evidence That in the Era of Targeted Therapies, Patients on Lower Doses Do Not Fare Worse," Clinical Cancer Research, vol. 16, No. 4, 2010, pp. 1-15.
Kuznar, "P-HA conjugate induces CR in 75% of patients with bladder carcinoma in situ," Urology Times, 2020, p. 23.
Lee et al., "Biological Activity of a Thiobarbituric Acid Compound in Neuroblastomas," Anticancer Research, vol. 41, No. 3, 2021, pp. 1171-1181, 1 page total.
Lee et al., "Characterization of a Novel Barbituric Acid and Two Thiobarbituric Acid Compounds for Lung Cancer Treatment," Anticancer Research, vol. 40, 2020, pp. 6039-6049.
Lightfoot et al., "Multi-institutional analysis of sequential intravesical gemcitabine and mitomycin C chemotherapy for non-muscle invasive bladder cancer," Urologic Oncology, vol. 32, No. 1, 2014, pp. e15-e19, 1 page total.
Mckiernan et al., "A Phase I Trial of Intravesical Nanoparticle Albumin-Bound Paclitaxel in the Treatment of Bacillus Calmette-Guérin Refractory Nonmuscle Invasive Bladder Cancer," Journal of Urology, vol. 186, 2011, pp. 448-451.
Mckiernan et al., "Phase: I Trial of Intravesical Docetaxel in the Management of Superficial Bladder Cancer Refractory to Standard Intravesical Therapy," Journal of Clinical Oncology, vol. 24, No. 19, 2006, pp. 3075-3080.
Mckiernan et al., "Phase II Trial of Intravesical Nanoparticle Albumin Bound Paclitaxel for the Treatment of Nonmuscle Invasive Urothelial Carcinoma of the Bladder after bacillus Calmette-Guérin Treatment Failure," Journal of Urology, vol. 192, 2014, pp. 1633-1638.
Robins et al., "Long-term Survival Outcomes With Intravesical Nanoparticle Albumin-bound Paclitaxel for Recurrent Non-muscle-invasive Bladder Cancer After Previous Bacillus Calmette-Guérin Therapy," Urology, vol. 103, 2017, pp. 149-153, 1 page total.
Shinde et al., "An efficient and safe process for the preparation of ticagrelor, a platelet aggregation inhibitor via resin-NO2 catalyzed formation of triazole ring," SpringerPlus, vol. 4, No. 493, 2015, pp. 1-11.
Skinner et al., "SWOG So353: Phase II trial of intravesical gemcitabine in patients with nonmuscle invasive bladder cancer and recurrence after 2 prior courses of intravesical bacillus Calmette-Guérin," Journal of Urology, vol. 190, No. 4, 2013, pp. 1200-1204, 1 page total.
Steinberg et al., "Sequential Intravesical Gemcitabine and Docetaxel for the Salvage Treatment of Non-Muscle Invasive Bladder Cancer," Bladder Cancer, vol. 1, No. 1, 2015, pp. 65-72, 1 page total.
Sternberg et al., "Intravesical gemcitabine for high risk, nonmuscle invasive bladder cancer after bacillus Calmette-Guérin treatment failure," Journal of Urology, vol. 190, No. 5, 2013, pp. 1686-1691, 23 pages total.

\* cited by examiner

PACLITAXEL-HYALURONIC ACID CONJUGATE IN THE TREATMENT OF NON-MUSCLE INVASIVE BLADDER CANCER

CROSS-REFERENCE TO RELATED APPLICATIONS

This application is a Continuation of co-pending U.S. patent application Ser. No. 17/204,183, filed Mar. 17, 2021, which is a Continuation of co-pending U.S. patent application Ser. No. 16/959,979, filed Jul. 2, 2020, which is the National Phase under 35 U.S.C. § 371 of International Application No. PCT/IB2019/059073, filed on Oct. 23, 2019, which claims the benefit under 35 U.S.C. § 119 (a) to patent application No. 102018000009731, filed in Italy on Oct. 25, 2018, all of which are hereby expressly incorporated by reference into the present application.

OBJECT OF THE INVENTION

The present invention describes a pharmaceutical composition essentially consisting of paclitaxel prodrug associated with pharmacologically acceptable diluents/excipients, for use in the treatment of non-muscle invasive bladder cancer (NMIBC) through intravesical instillations according to a therapeutic scheme that involves the administration of a single weekly dose of 600 mg of said prodrug, or two weekly doses equal to a total of 1200 mg, for 12 or 6 consecutive weeks of treatment.

The paclitaxel prodrug used was prepared according to a process of indirect synthesis between molecules of hyaluronic acid (HA) and paclitaxel by introducing a spacer (4-bromobutyric acid) between the hyaluronic acid and chemotherapeutic agent.

FIELD OF THE INVENTION

Malignant tumours of the bladder are usually formed from its epithelial tissue and are therefore carcinomas. Only in very few cases does bladder cancer have a different origin and it therefore belongs to the categories of melanomas, lymphomas or sarcomas. Most bladder tumours are transitional (or urothelial) carcinomas as they derive from the transition epithelium. Squamous cell bladder carcinomas and adenocarcinomas are much rarer.

A tumour that invades the detrusor muscle is called muscle-invasive carcinoma (MIBC) as it tends to metastasize by spreading to lymph nodes or other organs, however about 75-85% of newly diagnosed patients have a non-muscle-invasive bladder carcinoma (NMIBC) which is classified as:

Ta, papillary carcinoma confined to the surface of the mucosa (about 70% of NMIBCs);

T1, papillary carcinoma that passes through the mucosa (about 20% of NMIBCs);

CIS (Carcinoma In Situ), a flat tumour confined to the mucosa, often multifocal (about 10% of NMIBCs), with a high degree of anaplasia is considered the precursor of muscle-invasive carcinoma.

The most common symptom of bladder cancer is hematuria (blood in the urine), in 78.3% of patients it is macrohematuria or macroscopic hematuria, visible to the naked eye. The suspicion of carcinoma may also be seen in patients with non-specific symptoms affecting the lower urinary tract, associated with an increase in urinary stimulus and its frequency with dysuria (difficult emission of urine). These symptoms are more frequent in patients with CIS with respect to papillary tumours, in all cases they suggest the need for a urological evaluation. The absence of specific tumour markers and the variability with which hematuria occurs are among the main causes of underestimation of this tumour. The diagnostic confirmation is obtained with a histological examination using transurethral biopsy.

The standard of treatment of bladder cancer is transurethral resection of bladder tumour (TURBT). Endoscopic surgery can be followed by:

for NMIBCs: intravesical instillations of chemotherapeutic drugs such as, for example, mitomycin C, or immunotherapies such as the *bacillus* of Calmette-Guérin (BCG). Treatment with BCG is currently the best therapy for Carcinoma In Situ. The purpose of these instillations is the prevention of recurrences that occur at a frequency rate of 30-60% and that require patient monitoring for at least 5 years;

for MIBCs: cystectomy and radiotherapy often in combination with chemotherapy.

Radical cystectomy is a surgical procedure that involves removing the bladder and possibly other pelvic organs.

The risk classification for recurrence and progression of the disease that is obtained from the histological examination allows the opportunity of the following adjuvant treatments to be defined:

patients at a low risk of recurrence undergo TURBT to remove all visible lesions, they subsequently receive (within the first few hours after surgery) a single perioperative dose of intravesical chemotherapy;

patients at an intermediate risk of recurrence and a low risk of progression are subjected to the administration of a single perioperative dose of intravesical chemotherapy, followed by an adjuvant therapy based on intravesical chemotherapy or immunotherapeutic instillations (BCG);

patients at a high risk of progression (especially with CIS) are always subjected to intravesical adjuvant therapy with BCG, a high percentage of patients however acquires resistance to this treatment. For patients who are unresponsive or refractory to BCG, the only therapeutic option that therefore remains is radical cystectomy with concomitant urinary derivation, otherwise the carcinoma evolves towards the infiltrating form.

BCG is a poorly tolerated drug that can give different side-effects such as prostatitis, orchitis, arthritis and rarely also urethral obstructions. A patient who is not responsive to BCG is a patient who does not benefit from this therapy, he/she generally belongs to the group of patients who have previously been treated with BCG but who subsequently no longer respond to the same therapy, whereas patients defined as refractory are those for whom the toxic effects of the drug far outweigh the benefits.

The treatment of bladder cancer is one of the most expensive due to the high rates of recurrence which therefore require intensive surveillance strategies with periodic examinations (cystoscopy, blood and urine tests).

In particular, the management of non-muscle-invasive tumours (NMIBC) is more expensive than that of invasive tumours (MIBC) specifically due to the high rate of local recurrences involving repeated resection interventions and control tests, in addition to cycles of intravesical instillations of chemo or immunotherapeutic drugs; it should finally be pointed out that in the case of CIS non-responsive to treatment with BCG, the only therapeutic option remains radical cystectomy, a very invasive intervention that gives important consequences on the patient's quality of life.

In Italy, the annual cost for the management of this disease represents 7% of the entire health expenditure as bladder cancer is the 5th cancer in the Western world by incidence and the 2nd among urinary tract tumours after carcinoma of the prostate.

Paclitaxel (Taxol®) is an antitumor agent (Huizing M T et al., Cancer Inv., 1995, 13:381-404) which exerts its antiproliferative action by acting on the microtubule organization of the cellular cytoskeletal system, preventing its normal reorganization during the mitotic division (Manfredi J J et al., J Cell Biol, 1982, 94:688-696).

The main therapeutic indications of paclitaxel are the treatment of advanced breast cancer, lung cancer, ovarian cancer resistant to standard chemotherapy treatment, bladder cancer, prostate cancer and endometrium. Due to its high lipophilicity, the administration of this chemotherapeutic agent generates numerous problems, but, due to its efficacy, it is certainly also a candidate for the local treatment of bladder cancer; the high concentrations of drug used for bladder instillations, however, cause paclitaxel to penetrate the urothelium resulting in a significant systemic, toxic absorption of this drug.

The solubilization solvent currently used in normal clinical protocols for the administration of paclitaxel is Cremophor EL which, however, causes multiple hypersensitivity phenomena.

In recent years, numerous experimental attempts have been made to overcome the problems resulting from the formulation of paclitaxel in Cremophor, for both making it soluble in water and also for defining new methods of administration. Attempts have been made, for example, to encapsulate the above-mentioned anticancer agent in liposomes, nanocapsules and microspheres consisting of a polymeric wall formed by biodegradable copolymers (such as poly-lactic acid or poly-phosphoester) and non-biodegradable copolymers (such as ethylene-vinyl-acetate).

Attempts have also been made to prepare micelles by co-precipitating paclitaxel with phosphatidylcholine/bile salts in organic solvent (Nuijen B et al., Investigational New Drugs, 2001, 19:143-153).

Various attempts have been made to solubilize the above-mentioned drug with cyclodextrins, but the new formulations have not given the desired results (Nuijen B et al., Investigational New Drugs, 2001, 19:143-153).

The use of PEG (poly-ethylene-glycol) is also known for the derivatization of the above-mentioned chemotherapeutic drug through its esterification, however the new molecule proved to be extremely water-soluble but with a limited stability.

Finally, a paclitaxel release system was developed by conjugating it with the serum albumin protein (HSA): the paclitaxel-HSA conjugate was found to be extremely water-soluble, capable of carrying up to 30 molecules of chemotherapeutic agent, but in vitro experiments revealed a lower antitumour efficacy compared to paclitaxel per se (Nuijen B et al., Investigational New Drugs, 2001, 19:143-153).

The conjugate of paclitaxel with hyaluronic acid (HA) derivatized with hydrazide molecules bound to the carboxyl group of HA by an amide bond was also recently synthesized (Luo Y et al., Biomacromolecules. 2000, 1 (2): 208-218).

The bond between paclitaxel and HA allows the drug to reach the surface of the tumour cell membrane directly, said cell being characterized by an over-expression of the HA receptor, CD44. Paclitaxel conjugated with HA consequently proves to be capable of binding specifically to the CD44 of the tumour cell, allowing it to enter the cellular cytoplasm where it is activated thanks to the hydrolysis of the drug/HA bond. This selective drug transport mechanism is referred to as "targeting" to the target cell.

HA is a hetero-polysaccharide composed of alternating residues of D-glucuronic acid and N-acetyl-D-glucosamine. It is a linear chain polymer with a molecular weight ranging from 50,000 to $13 \times 10^6$ Da, depending on the source from which it is obtained and the preparation methods used. It is present in nature in pericellular gels, in the fundamental substance of the connective tissue of vertebrate organisms (of which it represents one of the main components), in the synovial fluid of the joints, in the vitreous humor and in the umbilical cord.

The present invention proposes to overcome the drawbacks of the prior art described above and relates to a pharmaceutical composition essentially consisting of paclitaxel prodrug associated with pharmacologically acceptable diluents/excipients, for use in the treatment of non-infiltrating bladder cancer by intravesical instillations according to a therapeutic scheme that involves the administration of a single weekly dose of 600 mg of said prodrug, or two weekly doses equal to a total of 1,200 mg, for 12 (in the case of 600 mg as a single dose) or for 6 (in the case of 1,200 mg as double dose) consecutive weeks of treatment.

The paclitaxel prodrug used in the therapeutic scheme described above was prepared according to an indirect synthesis process between molecules of hyaluronic acid (HA) and paclitaxel, by introducing a spacer (4-bromobutyric acid) between the hyaluronic acid and chemotherapeutic agent. This synthesis is described in EP2045270, which states that conjugation with HA makes paclitaxel soluble: its administration can therefore take place without the multiple phenomena of hypersensitization that normally occur during the use of the drug due to the presence of Cremophor EL, the solubilization solvent currently used in normal clinical protocols for the administration of paclitaxel, as a liposoluble drug.

DETAILED DESCRIPTION OF THE INVENTION

The present invention relates to a pharmaceutical composition consisting of a paclitaxel prodrug associated with pharmacologically acceptable diluents/excipients, for use in the treatment of non-muscle invasive bladder cancer (NMIBC) by intravesical instillation, in particular bladder carcinoma in situ (CIS) and preferably in the treatment of non-responsive or refractory CIS to treatment with the *bacillus* Calmette-Guérin (BCG), wherein said pharmaceutical composition is administered:
  a. as a single weekly dose of 600 mg for 12 consecutive weeks of treatment, or
  b. as a double weekly dose for a total of 1,200 mg of composition per week for 6 consecutive weeks of treatment,
wherein the paclitaxel prodrug consists of the chemical conjugate between paclitaxel and hyaluronic acid through 4-bromobutyric acid, said HA being indirectly bound to paclitaxel by the ester bond between the carboxyl of HA and the 4-bromobutyric acid spacer in turn bound with an ester bond through its carboxyl to the hydroxyl group of the carbon in C2' of paclitaxel, with a derivatization degree within the range of 18-21% weight/weight, preferably equal to 20% w/w.

The pharmaceutical composition for use according to the present invention is preferably for use in the treatment of CIS non-responsive or refractory to treatment with BCG and the paclitaxel-HA prodrug consists in the chemical conjugate between paclitaxel and hyaluronic acid with a derivatization degree within the range 18-21% weight/weight.

The pharmaceutical composition for use according to the present invention is preferably for use in the treatment of non-muscle invasive bladder carcinoma (NMIBC), particularly bladder carcinoma in situ (CIS) and preferably in the treatment of CIS non-responsive or refractory to treatment with BCG, and the paclitaxel-HA prodrug consists of the chemical conjugate between paclitaxel and hyaluronic acid with a derivatization degree equal to 20% weight/weight.

The pharmaceutical composition for use according to the present invention is even more preferably for use in the treatment of bladder carcinoma in situ (CIS) non-responsive or refractory to treatment with BCG.

In a preferred embodiment, the pharmaceutical composition for use according to the present invention is for use in the treatment of bladder carcinoma in situ (CIS) non-responsive or refractory to treatment with BCG, wherein said pharmaceutical composition is administered as a single weekly dose of 600 mg for 12 consecutive weeks of treatment and said prodrug consists of the chemical conjugate between paclitaxel and HA having a weight average molecular weight ranging from 160,000 to 230,000 Da, preferably with a derivatization degree equal to 20% weight/weight.

In a further preferred embodiment, the pharmaceutical composition for use according to the present invention is for use in the treatment of bladder carcinoma in situ (CIS) non-responsive or refractory to treatment with BCG, wherein said pharmaceutical composition is administered as a double weekly dose for a total of 1,200 mg of composition per week for 6 consecutive weeks of treatment and wherein said prodrug consists of the chemical conjugate between paclitaxel and HA having a weight average molecular weight ranging from 160,000 to 230,000 Da, preferably with a derivatization degree equal to 20% w/w.

In the pharmaceutical composition for use according to the present invention, the paclitaxel prodrug is preferably formulated in sterile isotonic water containing 5% glucose.

The present invention therefore relates to a pharmaceutical composition consisting of paclitaxel prodrug associated with pharmacologically acceptable diluents/excipients, for use in the treatment of bladder cancer by intravesical instillation, wherein said pharmaceutical composition is administered (i.e. is instilled in the bladder):
- as a single weekly dose of 600 mg for 12 consecutive weeks of treatment, or
- as a double weekly dose, i.e. 600 mg+600 mg, for a total of 1,200 mg of composition per week, i.e. with a double intravesical instillation, for 6 consecutive weeks of treatment, wherein said paclitaxel prodrug consists of the chemical conjugate between paclitaxel and hyaluronic acid (hereinafter defined as paclitaxel-HA prodrug or simply prodrug) through 4-bromobutyric acid with a derivatization degree within the range of 18%-21% weight/weight (w/w), preferably equal to 20% w/w, wherein the bladder cancer is a non-muscle-invasive carcinoma (NMIBC), in particular bladder Carcinoma In Situ (CIS), preferably in the treatment of CIS non-responsive or refractory to treatment with BCG.

In the present description, by the derivatization degree of the above-mentioned prodrug, the Applicant intends to define the weight percentage of paclitaxel vs the weight of the paclitaxel-HA prodrug, therefore 100 mg of said prodrug with a derivatization degree ranging from 18% to 21% w/w, will contain 18 mg, 19 mg, 20 mg or 21 mg of the above-mentioned paclitaxel chemotherapeutic agent depending on the derivatization degree indicated: consequently, to further illustrate, the derivatization degree at 20% w/w contains 20 mg of paclitaxel per 100 mg of prodrug.

It is obvious to a skilled person in the field, however, that at the end of said industrial synthesis processes, a small variation in the weight ratios between the molecules can always be present, hence the Applicant subsequently describing and claiming the derivatization range of the above-mentioned prodrug as ranging from 18% to 21% w/w, intends to claim all the written percentage values comprising #1%: by way of example, the degree of 20% w/w should therefore be understood as being 20%+1%.

The paclitaxel-HA prodrug used in the therapeutic scheme described above was prepared according to an indirect synthesis process (described in EP2045270) between molecules of hyaluronic acid and paclitaxel by introducing molecules of 4-bromobutyric acid as a spacer between the acid hyaluronic acid and the above-mentioned chemotherapeutic agent, and is summarized hereunder in a broad outline as follows:
the carboxylic group of the spacer is activated by an activating agent such as, for example, a carbodiimide and thus made suitable for the esterification of the hydroxyl function of the carbon in C2' of paclitaxel; the bond which is thus formed between the spacer and paclitaxel is of an ester type. The nucleophilic substitution of the carboxyl of HA with the bromine of said spacer (i.e. the 4-bromobutyric acid) is subsequently obtained, by direct contact in an anhydrous environment with the salt of TBA (tetrabutylammonium) of HA. In this way, also in this case, an ester bond is created between HA and the spacer previously bound to paclitaxel; alternatively, the nucleophilic substitution of the HA carboxyl with the bromine of the spacer can take place before the binding of the spacer itself to the taxanic component.

In short, the paclitaxel-HA prodrug claimed by the Applicant has an ester bond between the carboxyl of the above-mentioned polysaccharide and the spacer, in turn bound (again with an ester bond) through its carboxyl to the hydroxyl group of carbon in C2' of paclitaxel.

The HA used for the synthesis of the paclitaxel-HA prodrug can derive from any source, for example by extraction from rooster combs (for example according to EP0138572 or WO2018020458), or by technological means (for example according to EP2614088 or EP2614087), or preferably by fermentation (for example according to EP0716688), and having a weight average molecular weight ranging from 400 to $3 \times 10^6$ Da, in particular from 400 to $1 \times 10^6$ Da, even more particularly from 160,000 to 230,000 Da (weight average molecular weight refers to that calculated by the "intrinsic viscosity" method (Terbojevich et al., Carbohydr Res, 1986, 363-377)).

The paclitaxel-HA prodrug with a derivatization degree ranging from 18% to 21% w/w described and claimed by the Applicant is preferably prepared from an HA of a fermentative origin with a weight average molecular weight ranging from 160,000 to 230,000 Da; the prodrug with a degree of 20% w/w is preferable, again prepared from an HA of a fermentative origin with a weight average molecular weight ranging from 160,000 to 230,000 Da, therefore 600 mg of the above-mentioned paclitaxel-HA prodrug contain 120 mg of paclitaxel chemotherapeutic agent.

The paclitaxel-HA prodrug, claimed by the Applicant in the treatment of non-muscle-invasive bladder cancer, therefore has the ester bond between the carboxyl of the HA and the 4-bromobutyric acid spacer, in turn bound with an ester bond by its carboxyl to the hydroxyl group of carbon in C2

'of paclitaxel, with a derivatization degree ranging from 18% to 21% w/w; the prodrug used in the in vivo trial described hereunder was prepared from an HA of a fermentative origin with a weight average molecular weight ranging from 160,000 to 230,000 Da and with a derivatization degree of 20% w/w.

The paclitaxel-HA prodrug described and claimed is prepared as a pharmaceutical composition with pharmacologically acceptable diluents/excipients; said prodrug is preferably prepared in sterile, isotonic water, containing 5% glucose, in order to obtain this composition as a sterile and isotonic aqueous solution essentially consisting of the prodrug itself.

Example of the Preparation of the Paclitaxel-HA Prodrug with a Derivatization Degree of 20% w/w Preparation of the HA ester derivative (the HA used for this synthesis has a weight average molecular weight ranging from 160,000 to 230,000 Da) with paclitaxel with an esterification degree of the carboxyl of 20% w/w:

185.2 mg of 4-bromobutyric acid, 254.6 mg of EDC (1-ethyl-3-(3-dimethylaminopropyl) carbodiimide) and 32.4 mg of DMAP (4-dimethylaminopyridine) were added to 308.7 mg of paclitaxel dissolved in 15 ml of dichloromethane. Water was subsequently added to the solution: the organic phase, separated from the aqueous phase (containing the bromide residue), was collected whereas the aqueous phase was eliminated. 25 ml of N-heptane were added at 10° C. to the organic solution obtained, obtaining the crystallization of the intermediate product, then isolated by filtration and subsequently dried. In this way, 301 mg of dry intermediate product were obtained. 164 mg of this intermediate were added to a solution of 566 mg of HA-TBA (HA salt with tetrabutylammonium) dissolved in 26 ml of NMP. After 2 days of reaction at T 38° C., 1 ml of saturated sodium bromide was added to the solution. After 1 hour, ethanol was slowly added dropwise. The product obtained was then precipitated in pure ethanol and washed in ethanol-water (8.5/1.5), rewashed with 100% ethanol, then dried at 40° C. The product was analyzed by HPLC analysis to control the actual derivatization degree and the degree of purity of the prodrug prepared.

In the clinical trial described hereunder, the Applicant demonstrated how the treatment through intravesical instillation of the prodrug at 20% (described above) in patients with CIS not responsive or refractory to BCG, as a single administration at a weekly dose of 600 mg for 12 consecutive weeks of treatment, caused the complete resolution of the CIS carcinoma in 15 patients out of the 20 treated, thus subtracting them from radical cystectomy otherwise necessary for avoiding the progression of this carcinoma towards its metastatic form.

Clinical Trials

Targets:
1. assess the effectiveness of the treatment method for NMIBC bladder cancer, in particular Carcinoma In Situ (CIS) non-responsive or refractory to BCG, through intravesical instillation of the pharmaceutical composition essentially consisting of the paclitaxel-HA prodrug administered as a single weekly dose of 600 mg for 12 consecutive weeks, wherein said prodrug has a derivatization degree of 20% w/w; this evaluation is performed by cystoscopy of the bladder at the end of treatment, and relative biopsy of the bladder mucosa with cytology of its urothelium. "patient with complete positive response" (CR) is defined as a patient who, at the end of the 12 instillations, has both the bioptic examination with cytology and the relative cystoscopy negative, i.e. no tumour cells are present or detectable throughout the thickness of the mucosa;
2. assess the safety and tolerability of the treatment with said prodrug, by analyzing/recording not only all the adverse events that occur during and at the end of the treatment, but also evaluating the possible systemic absorption of paclitaxel following administration of the prodrug. To this end, patients are periodically subjected to hematological analyses with urine analysis and a medical examination.

Preparation of the Pharmaceutical Composition of the Paclitaxel-HA Prodrug

The final pharmaceutical form was presented as a solution for intravesical instillation consisting of 600 mg of the paclitaxel-HA prodrug previously described, prepared in 50 ml of sterile isotonic water containing 2.5 mg of glucose (the prodrug was therefore prepared in a 5% glucose).

This solution had a final concentration of prodrug in glucose of 12 mg/ml.

Treatment

At the end of the trial, 20 patients with CIS non-responsive or refractory to BCG were recruited, i.e. patients who are candidates for radical cystectomy, as the treatment of the patient with the Calmette-Guérin *bacillus* had not led to any positive response to this immunotherapy. They were treated according to the protocol described and claimed, i.e by intravesical instillation with a single weekly dose of 600 mg of paclitaxel-HA prodrug (previously described) for 12 consecutive weeks of treatment. The solution in glucose containing the prodrug was slowly infused into the bladder (within 5 minutes) by an intravesical catheter, followed by a residence time of the drug in the bladder of 120 minutes; during this treatment the patient was instructed to turn on his right side alternating with his left side every 30 minutes to ensure complete contact of the composition on the entire inner surface of the bladder.

Any adverse event was promptly reported to the doctor who performed periodic checkups. Blood samples were also taken both at the beginning of the trial and at the end of each instillation, in order to evaluate the systemic absorption of paclitaxel. At the end of the trial, each patient underwent a medical examination with cystoscopy and biopsy of the bladder mucosa with urothelium cytology, haematological samples and urine analysis, for the final clinical evaluation.

Results

1. Evaluation of the effectiveness of the treatment method of CIS non-responsive or refractory to BCG:
   out of 20 patients treated were classified as patients with complete positive response and therefore defined CR: this result therefore showed how 75% of patients treated, all potentially candidates for radical cystectomy to reduce the risk of transformation of the tumour from NMIBC to MIBC, were CRs as they were patients negative for both endoscopic examination and bioptic analysis as they did not have any tumour cell detectable at bladder level after cytology of the mucosa and urothelium.
2. Assessment of the safety and tolerability of the treatment with this prodrug: blood analysis of the patients treated for evaluating the possible systemic absorption of paclitaxel did not produce quantifiable drug values; furthermore, no adverse events were reported as "serious", nor was there any significant change in hematological and clinical values periodically measured in patients reported, with no alteration of their vital signs.

This clinical trial unequivocally demonstrated the efficacy of the treatment method object of the invention as it allowed patients with CIS non-responsive or refractory to treatment with BCG to avoid radical cystectomy.

With the present patent application, the Applicant describes and claims a pharmaceutical composition essentially consisting of the prodrug paclitaxel-HA associated with pharmacologically acceptable diluents/excipients, for use in the treatment of non-muscle-invasive bladder cancer (NMIBC) by intravesical instillation, in particular of bladder carcinoma in situ (CIS), preferably in the treatment of CIS non-responsive or refractory to treatment with BCG, wherein this pharmaceutical composition is administered:
- as a single weekly dose of 600 mg for 12 consecutive weeks of treatment, or
- as a double weekly dose, i.e. 600 mg+600 mg, for a total of 1,200 mg of composition per week for 6 consecutive weeks of treatment, wherein said prodrug consists of the chemical conjugate between paclitaxel and HA, preferably having a weight average molecular weight ranging from 160,000 to 230,000 Da, wherein said HA is bound indirectly to paclitaxel through the ester bond between the carboxyl of HA and the 4-bromobutyric acid spacer, in turn bound with an ester bond through its carboxyl to the hydroxyl group of the carbon in C2' of paclitaxel with a derivatization degree within the range of 18-21% weight/weight (defined as the percentage by weight of paclitaxel vs the weight of the paclitaxel-HA prodrug), and preferably equal to 20% w/w.

The invention claimed is:

1. A method of treating non-muscle invasive bladder cancer (NMIBC) by intravesical instillation, which comprises administering to a patient in need thereof a pharmaceutical composition consisting of a paclitaxel prodrug and one or more pharmaceutically acceptable diluents/excipients,
wherein the pharmaceutical composition is administered as a single weekly dose of 600 mg for 12 consecutive weeks of treatment, and
wherein the paclitaxel prodrug consists of a conjugate between paclitaxel and hyaluronic acid (HA) by means of a 4-bromobutyric acid spacer, said HA being bound indirectly to the paclitaxel through an ester bond between a carboxyl of the HA and the 4-bromobutyric acid spacer in turn bound with an ester bond through its carboxyl to the hydroxyl group of the carbon in C2' of paclitaxel, with a derivatization degree equal to 20% weight/weight,
the paclitaxel prodrug being prepared by a process comprising the following steps:
step A: the 4-bromobutyric acid spacer is added to paclitaxel in presence of EDC (1-ethyl-3-(3-dimethylaminopropyl) carbodiimide) and DMAP (4-dimethylaminopyridine) in dichloromethane;
step B: water is added to the solution of step A to form an organic phase and an aqueous phase;
step C: the organic phase is separated from the aqueous phase, the organic phase being collected and the aqueous phase being eliminated;
step D: N-heptane is added to the organic phase collected in step C, resulting in crystallization of an intermediate product, which is then isolated by filtration and subsequently dried;
step E: the so obtained intermediate product of step D is added to a solution of HA salt with tetrabutylammonium wherein said hyaluronic acid has a weight average molecular weight ranging from 160,000 to 230,000 Da, and reacted;
step F: at the end of the reaction, saturated sodium bromide is added to the solution of step E and then ethanol is slowly added;
step G: the product obtained in step F is precipitated in pure ethanol and washed in ethanol-water, rewashed with 100% ethanol, then dried, obtaining the paclitaxel prodrug.

2. The method of treating non-muscle invasive bladder cancer (NMIBC) according claim 1, wherein the non-muscle invasive bladder cancer (NMIBC) is bladder carcinoma in situ (CIS) non-responsive or refractory to treatment with Calmette-Guérin bacillus (BCG).

3. The method of treating non-muscle invasive bladder cancer (NMIBC) according claim 1, wherein the non-muscle invasive bladder cancer (NMIBC) is bladder carcinoma in situ (CIS) non-responsive or refractory to treatment with Calmette-Guérin bacillus (BCG),
wherein the paclitaxel prodrug is formulated in sterile isotonic water which contains 5% glucose,
and wherein the patient at the end of the 12 consecutive weeks of treatment has a 75% probability to be negative for both endoscopic examination and bioptic analysis as the patient did not have any tumor cell detectable at bladder level after cytology of the mucosa and urothelium.

4. A method of treating non-muscle invasive bladder cancer (NMIBC) by intravesical instillation, which comprises administering to a patient in need thereof a pharmaceutical composition consisting of a paclitaxel prodrug and one or more pharmaceutically acceptable diluents/excipients,
wherein the pharmaceutical composition is administered as a single weekly dose of 600 mg for 12 consecutive weeks of treatment, and
wherein the paclitaxel prodrug consists of a conjugate between paclitaxel and hyaluronic acid (HA) by means of a 4-bromobutyric acid spacer, said HA being bound indirectly to the paclitaxel through an ester bond between a carboxyl of the HA and the 4-bromobutyric acid spacer in turn bound with an ester bond through its carboxyl to the hydroxyl group of the carbon in C2' of paclitaxel, with a derivatization degree equal to 20% weight/weight,
the paclitaxel prodrug being prepared by a process consisting of the following steps:
step A: the 4-bromobutyric acid spacer is added to paclitaxel in presence of EDC (1-ethyl-3-(3-dimethylaminopropyl) carbodiimide) and DMAP (4-dimethylaminopyridine) in dichloromethane;
step B: water is added to the solution of step A to form an organic phase and an aqueous phase;
step C: the organic phase is separated from the aqueous phase, the organic phase being collected and the aqueous phase being eliminated;
step D: N-heptane is added to the organic phase collected in step C, resulting in crystallization of an intermediate product, which is then isolated by filtration and subsequently dried;

step E: the so obtained intermediate product of step D is added to a solution of HA salt with tetrabutylammonium wherein said hyaluronic acid has a weight average molecular weight ranging from 160,000 to 230,000 Da, and reacted;

step F: at the end of the reaction, saturated sodium bromide is added to the solution of step E and then ethanol is slowly added;

step G: the product obtained in step F is precipitated in pure ethanol and washed in ethanol-water, rewashed with 100% ethanol, then dried, obtaining the paclitaxel prodrug, wherein the non-muscle invasive bladder cancer (NMIBC) is bladder carcinoma in situ (CIS) non-responsive or refractory to treatment with Calmette-Guérin *bacillus* (BCG);

wherein the paclitaxel prodrug is formulated in sterile isotonic water which contains 5% glucose, and wherein the patient at the end of the 12 consecutive weeks of treatment has a 75% probability to be negative for both endoscopic examination and bioptic analysis as the patient did not have any tumor cell detectable at bladder level after cytology of the mucosa and urothelium.

\* \* \* \* \*